United States Patent
Ayers et al.

(10) Patent No.: US 7,613,705 B2
(45) Date of Patent: Nov. 3, 2009

(54) INITIAL FILTER CRITERIA (IFC) DATABASE WITH CLASS OF SERVICE (COS)

(75) Inventors: John I. Ayers, Omaha, NE (US); Anders H. Askerup, Omaha, NE (US); Bradley T. Kenyon, Omaha, NE (US); Srinivas Chilukuri, Omaha, NE (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 455 days.

(21) Appl. No.: 11/213,361

(22) Filed: Aug. 26, 2005

(65) Prior Publication Data

US 2007/0067470 A1    Mar. 22, 2007

(51) Int. Cl.
G06F 7/00  (2006.01)
G06F 17/30  (2006.01)
(52) U.S. Cl. .......................................... 707/10; 725/144
(58) Field of Classification Search .................. None
See application file for complete search history.

(56) References Cited

U.S. PATENT DOCUMENTS

2005/0190772 A1* 9/2005 Tsai et al. .............. 370/395.52
2006/0035637 A1* 2/2006 Westman ................. 455/435.3
2006/0140385 A1* 6/2006 Haase et al. ............ 379/221.09

OTHER PUBLICATIONS

Hoffer et al., Modern Database Management, Apr. 6, 2004, Prentice Hall, Seventh Eddition, 187-226.*
Wikipedia, The Free Encyclopedia, IP Multimedia Subsystem, http://en.wikipedia.org, pp. 1-8, prior to Aug. 2005.
U.S. Office Action in co-pending U.S. Appl. No. 11/213,357, and entitled "Application Server (AS) Database With Class of Service (COS)" having a date of mailing of Mar. 5, 2009.

* cited by examiner

Primary Examiner—Jean B Fleurantin
Assistant Examiner—Aleksandr Kerzhner

(57) ABSTRACT

Systems, methodologies, media, and other embodiments associated with provisioning an internet protocol (IP) multimedia sub-system (IMS) are described. One exemplary system embodiment includes logic for provisioning an IMS initial filter criteria (IFC) database with IFC data and logic for provisioning an IMS user database with user data. The exemplary system embodiment may also include logic for provisioning an IMS call session control function (CSCF) logic with data that relates user data to IFC data based, at least in part, on a class of service (COS) identifier.

15 Claims, 10 Drawing Sheets

INITIAL FILTER CRITERIA (IFC) DATABASE WITH CLASS OF SERVICE (COS)

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

CROSS-REFERENCE TO RELATED APPLICATIONS

This application is related to the following U.S. patent applications, which are all assigned to the present assignee:

"Application Server (AS) Database With Class Of Service (COS)", Ser. No. 11/213,357 filed Aug. 26, 2005, inventors: Ayers et al.;

"Automated Application Server (AS) Permissions Provisioning", Ser. No. 11/213,363 filed Aug. 26, 2005, inventors: Ayers et al.;

"Charging Database with Class of Service (COS)", Ser. No. 11/212,246 filed Aug. 26, 2005, inventors: Ayers et al.

BACKGROUND

Multimedia networks provide services above and beyond simple telephony. Thus, telephones no longer just transmit and receive telephone calls. Devices including cellular telephones, PDAs, laptop computers, and so on, collectively referred to as user equipment (UE), may transmit and receive telephone calls, may transmit and receive text messages, may participate in video-conferencing, may participate in multi-player gaming, may share content, and so on. These types of activities may be referred to collectively as multimedia services. In some cases these multimedia services may be provided over the Internet using the Internet Protocol (IP).

An IP Multimedia Core Network Subsystem (IMS) includes core network (CN) elements for providing IP multimedia services. These IP multimedia services may include telephony (e.g., Voice over IP (VoIP)), push to talk over cellular (PoC), text messaging, and so on. Within various services, other sub-services may be provided. For example, in the telephony service, sub-services including call forwarding, call waiting, voice mail, multi-party calling, and so on, may be provided. Conventionally, each of these services and/or sub-services may have been provided by a stand-alone electronic system, computer, and/or computer system. Various IMS components (e.g., switches) may be configured with information concerning a user on a per-session basis to facilitate connecting the user to services. Similarly, a component like an Application Server (AS) may be provided with information concerning the user to facilitate providing an authorized service for the user.

IMS defines how requests for service are routed to an AS that can provide the service. The routing may depend, at least in part, on information in a request. Thus, IMS components may be configured with information that describes how a request is to be evaluated and to which AS a request should be routed based on the evaluation. Conventionally, information concerning how to route messages may have been stored for each subscriber.

A user may access services via a dynamically associated, service-independent, standardized access point referred to as a call session control function (CSCF). A CSCF may be allocated dynamically to a user at log-on or when a request addressed to the user is received. To facilitate interacting with a user, a CSCF may acquire data (e.g., user data) that is more permanently stored in a Home Subscriber Server (HSS). The user data may include, for example, information that controls how a request is routed, information about which core network services a user is authorized to use, and so on.

Organizations with an IMS based communication network may store data concerning their network. These organizations may store data not only about their network (e.g., configuration) but also about the users (e.g., subscribers) who use the network, devices (e.g., CSCF) that participate in providing services, application servers that provide services, and so on. Conventionally, IMS networks may have used a large database that stored a record for each subscriber, with each record storing a large amount of diverse information. The database may have stored information including public and private user identities, services subscribed to, a service provided by an AS, a CSCF available to handle communications, CSCF capabilities, criteria for routing requests, and so on.

All this information may typically have been stored in large subscriber records. However, this may have created provisioning, updating, maintenance, and other issues for database systems administrators and network administrators. By way of illustration, consider an IMS with one million subscribers. The subscribers may use different services provided by different applications servers and may move from place to place while doing so. In this situation, when some information that may affect all the users changes, then conventionally one million user records would need to be updated. Additionally, each subscriber may have several sets of rules for how to route messages. Consider a situation where an IMS averages 15 sets of rules per user, 15 million sets of rules may need to be stored. This may be wasteful since many of the rules may be identical and thus duplicative.

Furthermore, consider an IMS having thousands of components (e.g., switches) that are configured with user information including routing criteria, authorized services, and so on. If information downloaded to one of these components changes, then a system administrator may need to locate the components in which the information was stored and update each of them. This may be undesirable and/or inefficient.

Additionally, adding and/or defining a user may create issues. For example, every user that is added or defined in the database may force the administrator to have to re-provision and define routing criteria, core services authorization data, and so on for the user. This creates many opportunities for errors as each record is individually provisioned.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

FIG. 8 illustrates an example set of messages passed between an HSS and a CSCF and between an HSS and an AS.

DETAILED DESCRIPTION

Figure 1:
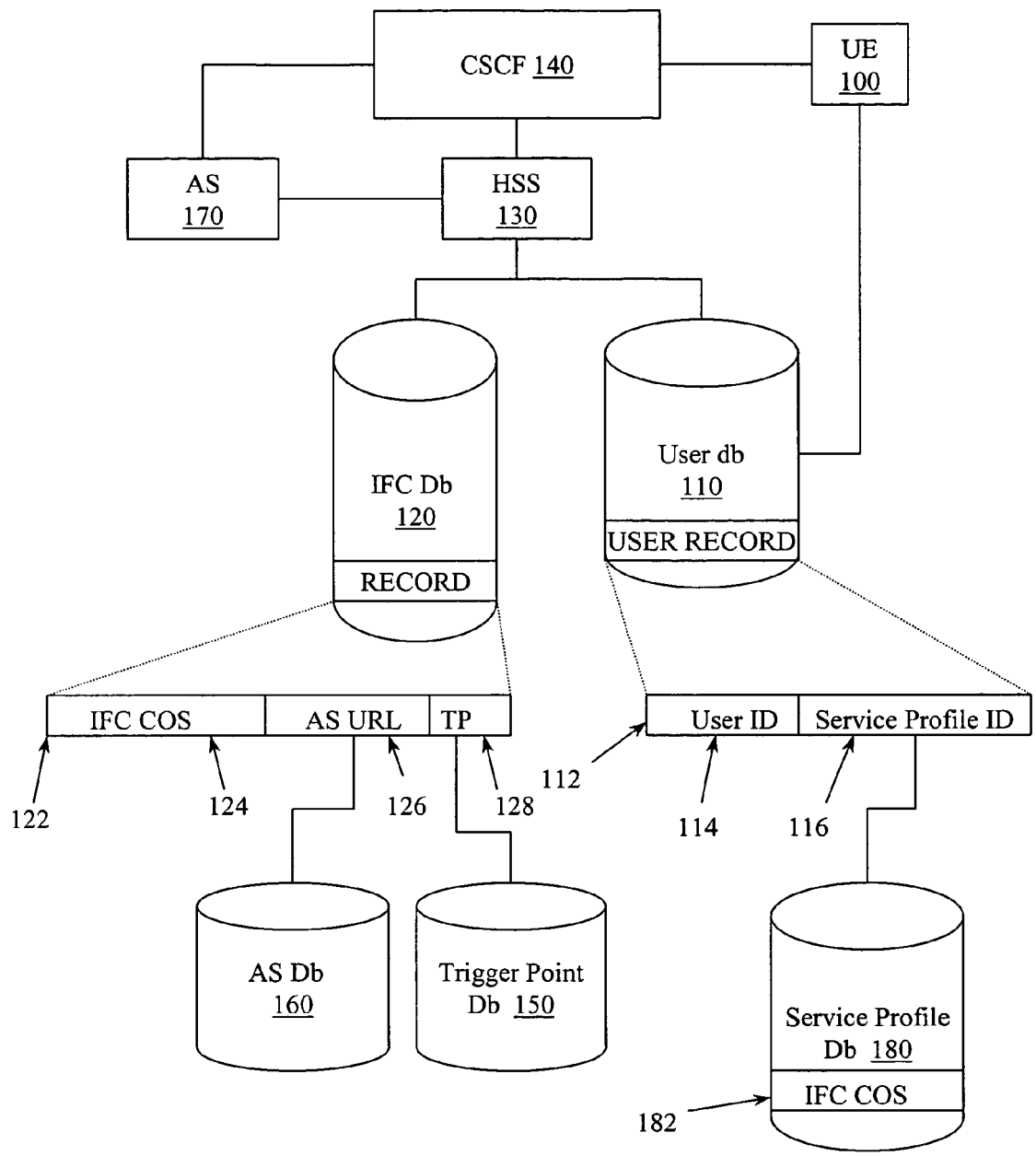
FIG. 1 illustrates portions of an example IMS.

The following includes definitions of selected terms employed herein. The definitions include various examples and/or forms of components that fall within the scope of a term and that may be used for implementation. The examples are not intended to be limiting. Both singular and plural forms of terms may be within the definitions.

"Computer-readable medium", as used herein, refers to a medium that participates in directly or indirectly storing and providing signals, instructions and/or data. A computer-readable medium may take forms, including, but not limited to, non-volatile media (e.g., optical disk, magnetic disk), and volatile media (e.g., semiconductor memory, dynamic memory). Common forms of a computer-readable medium include, but are not limited to, a floppy disk, a flexible disk, a hard disk, a magnetic tape, other magnetic medium, a CD-ROM, other optical medium, a RAM, a ROM, an EPROM, a FLASH-EPROM, or other memory chip or card, a memory stick, and other media from which a computer, a processor or other electronic device can read.

In some examples, "database" is used to refer to a table. In other examples, "database" may be used to refer to a set of tables. In still other examples, "database" may refer to a set of data stores and methods for accessing and/or manipulating those data stores.

"Data store", as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic", as used herein, includes but is not limited to hardware, firmware, software stored on a computer-readable medium and/or combinations of each to perform a function(s) or an action(s), and/or to cause a function or action from another logic, method, and/or system. For example, based on a desired application or needs, logic may include a software controlled microprocessor, discrete logic (e.g., application specific integrated circuit (ASIC)), an analog circuit, a digital circuit, a programmed logic device, a memory device containing instructions, and so on. Logic may include one or more gates, combinations of gates, or other circuit components. Logic may also be fully embodied as software stored on a computer-readable medium. Where multiple logical logics are described, it may be possible to incorporate the multiple logical logics into one physical logic. Similarly, where a single logical logic is described, it may be possible to distribute that single logical logic between multiple physical logics.

An "operable connection", or a connection by which entities are "operably connected", is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal", as used herein, includes but is not limited to one or more electrical or optical signals, analog or digital signals, data, one or more computer or processor instructions, messages, a bit or bit stream, or other means that can be received, transmitted and/or detected.

"Software", as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. The form of software may depend, for example, on requirements of a desired application, on the environment in which it runs, on the desires of a designer/programmer, and so on. Computer-readable and/or executable instructions may be located in one logic and/or distributed between two or more communicating, co-operating, and/or parallel processing logics and thus may be loaded and/or executed in serial, parallel, massively parallel and other manners.

Suitable software for implementing various components of example systems and methods described herein may be developed using programming languages and tools including Java, Pascal, C#, C++, C, CGI, Perl, SQL, APIs, SDKs, assembly, firmware, microcode, and/or other languages and tools. Software, whether an entire system or a component of a system, may be embodied as an article of manufacture and maintained or provided as part of a computer-readable medium as defined previously. Another form of software may include signals that transmit program code to a recipient over a network or other communication medium. Thus, in one example, a computer-readable medium has a form of signals that represent software/firmware as it is downloaded from a web server. In another example, a computer-readable medium has a form of software/firmware as it is maintained on a web server.

"User", as used herein, includes but is not limited to one or more persons, software, computers or other devices, or combinations of these.

Some portions of the detailed descriptions that follow are presented in terms of algorithms and symbolic representations of operations on data bits within a memory. These algorithmic descriptions and representations are the means used by those skilled in the art to convey the substance of their work to others. An algorithm is here, and generally, conceived to be a sequence of operations that produce a result. The operations may include physical manipulations of physical quantities. Usually, though not necessarily, the physical quantities take the form of electrical or magnetic signals capable of being stored, transferred, combined, compared, and otherwise manipulated in a logic and the like.

It has proven convenient at times, principally for reasons of common usage, to refer to these signals as bits, values, elements, symbols, characters, terms, numbers, and so on. It should be borne in mind, however, that these and similar terms are to be associated with the appropriate physical quantities and are merely convenient labels applied to these quantities. Unless specifically stated otherwise, it is appreciated that throughout the description, terms including processing, computing, calculating, determining, displaying, automatically performing an action, and so on, refer to actions and processes of a computer system, logic, processor, or similar electronic device that manipulates and transforms data represented as physical (electronic) quantities.

FIG. 1 illustrates portions of an example IMS. The IMS may facilitate providing services to users equipped with UE (e.g., UE 100). UE may include, for example, cellular telephones, personal digital assistants (PDAs), and so on. A UE may be associated with a user described in various data stores in the IMS. The user may subscribe to various services associated with various application servers. Thus, when a user desires access to a service, an IMS may make decisions concerning which AS will service the user. The AS to which a request from a user is routed may depend, for example, on Initial Filter Criteria (IFC) that describes how to screen requests from a user. The IFC may be associated with a Service Point Trigger (SPT) that can be used to evaluate a request. When an SPT is satisfied, additional data in an IFC, (e.g., AS identifier), may be used to route the request.

An IMS may include a user database 110 that is configured to store information concerning an IMS user. The information may be stored in a user record 112 that includes, for example, a user identifier 114, and a service profile identifier 116. An IMS user may be associated with IFC data that is transferred to various IMS elements (e.g., S-CSCF, AS). This IFC data may be personal to a user and/or may be employed by a group of users. IMS users may be associated with more than one IFC. As mentioned above, an IMS user may be associated with ten, twenty, or even more IFCs employed to screen messages. Conventionally, each of these IFCs may have been stored in a user record. This may be wasteful, particularly when IFCs are duplicative. For example, each IMS user may have an IFC that screens messages on a particular message type. If there are one million IMS users, then this IFC may be duplicated one million times. This is wasteful. Thus, rather than having user record 112 carry IFC information directly, user record 112 may use the service profile identifier 116 to link to an IFC database record 122 stored in an IFC database 120. The linkage may be established, for example, using an IFC COS identifier 182 stored in an service profile database 180. The IFC database 120 may in turn employ a COS technique to link to screening rules stored in other places (e.g., SPT file 960, FIG. 9). Using this COS technique, a single IFC configured to screen on the desired message type may be stored. In this example this would remove one million IFCs, one per IMS user. While IFC database 120 and user database 110 are illustrated as separate components, in one example, IFC database 120 and user database 110 may be organized together in an HSS database.

IFC database record 122 may include an IFC COS 124 that is used as a primary key. IFC record 122 may also include data like an AS address (e.g., Uniform Resource Locator (URL) 126), a link to a trigger point (TP) database 150 (e.g., TP identifier 128), a link to an AS database 160, and so on. TP identifier 128 can link data in TP database 150 (e.g., trigger points) to an IFC. The trigger points may describe tests, rules, and so on that when satisfied trigger routing a message to an AS. Trigger points facilitate controlling services provided based on screening information like message type, message header content, session information, and so on (see, for example, SPT file 960, FIG. 9). Accessing IFC database 120 by a COS identifier facilitates setting different criteria groups—which employ different trigger points—to be directed to specific AS entities for providing IMS service.

Decoupling IFC information from user data facilitates mitigating database maintenance and switching issues described above. For example, if IFC information changes then updates can be made in IFC database 120 rather than in each user record affected by the change. Similarly, if TP data changes, changes can be made in trigger point database 150. Additionally, if a new "generic" IFC is generated, it may be made available to each IMS user without reprovisioning each IMS user record. A single instance of the IFC may be stored and a COS technique employed to make that IFC available to IMS users who want to use it. While a separate service profile database 180 and user database 110 are illustrated, it is to be appreciated that other arrangements that include an IFC COS may be employed. Similarly, while a separate IFC database 120, AS database 160, and TP database 150 are illustrated, other arrangements that include an IFC COS configured to facilitate linking to an IFC COS associated with the user database 110 and/or service profile database 180 may be employed.

The IMS may include an HSS logic 130 that is configured to facilitate provisioning a CSCF logic 140. In one example, HSS logic 130 may also be configured to provision AS 170. In some examples, an S-CSCF may communicate with an HSS using a Cx protocol. An example Cx protocol is described in 3GPP TS 29.228 V5.12.0 (2005-06) and 3GPP TS 29.229 V5.10.0 (2005-03). Similarly, an HSS may communicate with an AS using an Sh protocol. An example Sh protocol is described in 3GPP TS 29.328 V5.10.0 (2005-06) and 3GPP TS 29.329 V5.10.0 (2005-03).

CSCF logic 140 may interact with HSS logic 130 to become provisioned to route user requests to an AS based, at least in part, on IFC associated with users. Part of the provisioning may include retrieving a user record from user database 110. Part of the provisioning may also include retrieving Core Network Services Authorization (CNSA) data, as will be described in connection with FIG. 2. Retrieving the user record may include, for example, retrieving information like the service profile identifier 116 which may in turn facilitate retrieving information like an IFC COS 182 that can be used to link to IFC database 120 and related databases (e.g., TP database 150).

While a single CSCF logic 140 is illustrated, it is to be appreciated that a CSCF logic may perform various roles and/or may be distributed between various logics. For example, a CSCF may perform a P-CSCF (proxy) role, an I-CSCF (interrogator) role, and/or an S-CSCF (serving) role. The proxy may be a first point of contact for a message, may be involved in authenticating a user, and may facilitate generating charging information, among other things. The interrogator may be an entry point to a domain for Session Internet Protocol (SIP) packets, may query an HSS to retrieve user location information to determine which S-CSCF, if any, to allocate to a user, and so on. The S-CSCF may perform session control and thus may perform, for example, SIP registration.

To direct a message to AS 170, CSCF logic 140 may need to determine the actual address (e.g., URL) of AS 170. The address to which a request is routed may depend on the contents of the message, the message type, the message header, and/or other data as evaluated in connection with trigger points (See, for example, SPT file 960, FIG. 9). Thus, IFC record 122, in addition to containing a pointer(s) 128 to a TP, may also include an AS URL 126 to which a request should be routed when a TP is satisfied. This information may not be known at the time when CSCF 140 is initially configured. Furthermore, CSCF logic 140 may be configured to only store this information as long as is necessary, (e.g., while user is registered with CSCF 140).

Thus, as part of a process run, for example, when UE 100 begins interacting with the IMS, messages may be transmitted to and/or from CSCF logic 140 to HSS logic 130 to acquire IFC data. Similarly, messages may be sent between HSS logic 130 and AS 170. Part of the information exchanged in these messages can be user service profile information stored in user database 110 and/or databases associated with user database 110. This service profile information can in turn be used to locate IFC data. Thus, part of the information exchanged can be used to link user database 110 to IFC database 120. Note that initially no specific IFC information may be downloaded to CSCF logic 140 through HSS logic 130. The specific IFC information (e.g., TP identifier, AS URL) can reside in the IFC database 120 and/or in databases related to the IFC database 120 (e.g., AS database 160, TP database 150) and can be retrieved using the IFC COS identifier 124. Thus, using an IFC COS decouples not only user database 110 and user records (e.g., 112) from specific IFC information but may also decouple CSCF logic 140 and/or AS 170 at least temporarily from IFC information. This may facilitate, among other things, mitigating systems administration, database management, and IMS switch maintenance issues identified above.

Like other information, IFC information may be dynamic. For example, a trigger point may change, an IFC may be added, and so on. Thus, after CSCF logic 140 receives IFC data, the IFC data may change. Having inaccurate data in CSCF logic 140 may be undesirable. In one example, HSS logic 130 may therefore be configured to update CSCF logic 140 and/or AS 170 upon determining that IFC information has changed since IFC data was provided to CSCF logic 140 and/or AS 170. In one example this may be accomplished using a Push Profile Request (PPR) message defined in a Cx protocol and/or a UDR/UDA exchange defined in a Sh protocol (See FIG. 8). Compare this more precise method to a conventional approach that updates every user record with changed billing information and updates every CSCF in an IMS with changed information.

Figure 2:
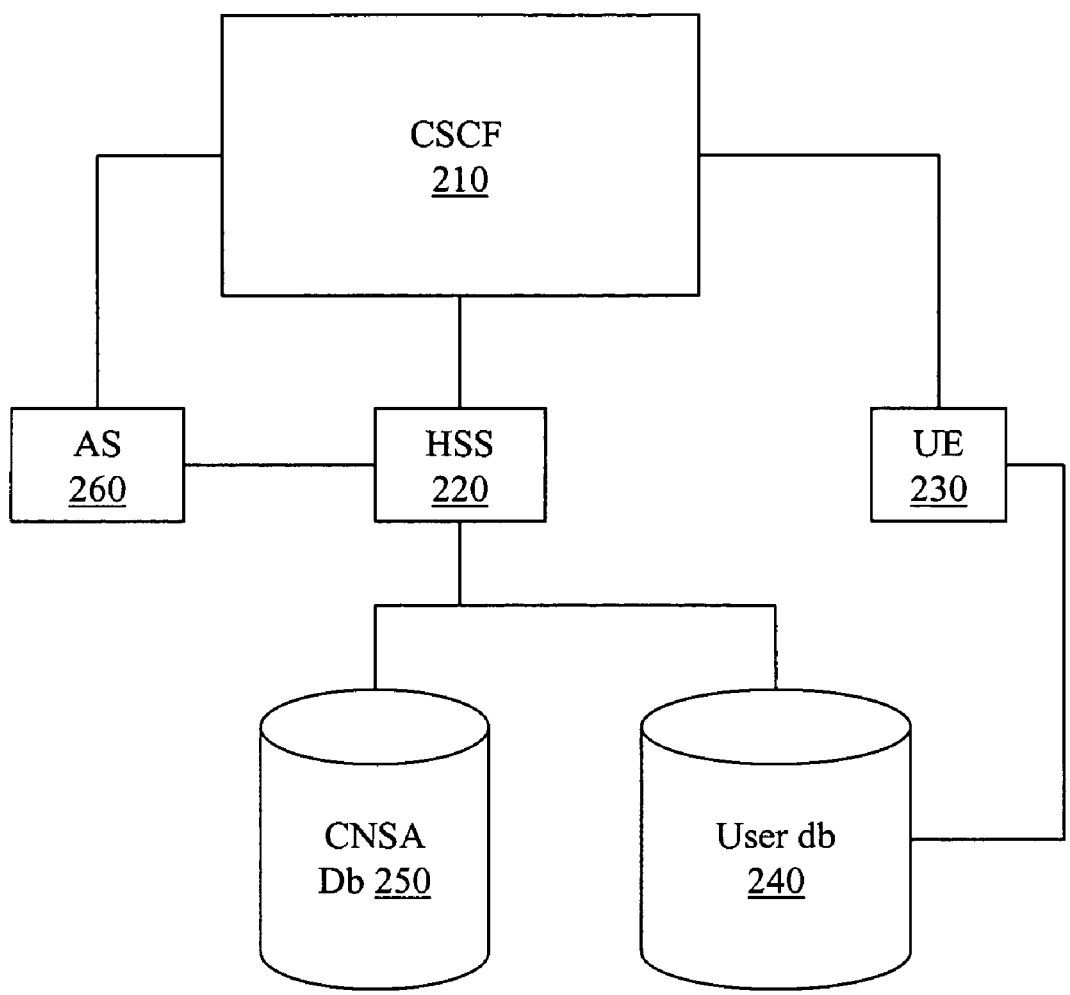
FIG. 2 illustrates portions of an example IMS.

FIG. 2 illustrates portions of an example IMS. The IMS may provide infrastructure for UE 230 to access services, to engage in communications, and so on. The IMS includes components similar to those described in connection with FIG. 1. For example, the IMS includes a CSCF logic 210, an HSS logic 220, and a user database 240 that may be configured to store information concerning an IMS user. The information may be stored in a user record in user database 240.

IMS users may be associated with CNSA information that is transferred to various IMS elements (e.g., CSCF 210) and/or other elements (e.g., AS 260). Thus, the user record may include and/or be related to a CNSA COS entry that facilitates linking a user record to a CNSA record and thus facilitates removing CNSA data from a user record. The CNSA record may include, for example, a subscribed media profile identifier that facilitates accessing a database configured to store information employed by an AS when providing services for an IMS user.

The system may also include a CNSA database (SCDB) 250 that is configured to store CNSA information concerning core network services a user is authorized to use. CNSA database 250 may store CNSA records that include a CNSA COS identifier configured as a primary key. Defining CNSA information at a COS level facilitates a systems administrator provisioning a group(s) of CNSA information in an IMS. The group(s) can be established independent of user configuration. Thus, the groups can be used by an IMS user(s) who has a link(s) to the group(s). Thus, CNSA information may be removed from user records, stored in CNSA database 250, and accessed using a COS identifier found in user database 240 as a primary key into CNSA database 250. Accessing CNSA database 250 using the COS facilitates setting different groups of IFC and service profiles to reference various groups of CNSA information for providing IMS services.

In one example, CNSA database 250 and user database 240 may be operably connected to a CSCF logic 210 by an HSS logic 220. CSCF logic 210 may retrieve a user record from user database 240 and then retrieve a CNSA record from CNSA database 250 using a CNSA COS identifier provided by and/or related to the user record. With the user record and the CNSA information available, CSCF logic 210 may then be selectively provisioned based, at least in part, on the CNSA record. To the extent AS 260 requires and/or desires CNSA information associated with a user, AS 260 may be similarly provisioned.

Like other information, CNSA information may be dynamic. Thus, in one example, HSS logic 220 may be configured to update CSCF logic 210 and/or AS 260 upon determining that CNSA information has changed since the CNSA information was retrieved. In one example this may be accomplished using a Push Profile Request (PPR) message defined in a Cx protocol and/or a UDR/UDA exchange defined in a Sh protocol.

Example methods may be better appreciated with reference to flow diagrams. While for purposes of simplicity of explanation, the illustrated methods are shown and described as a series of blocks, it is to be appreciated that the methods are not limited by the order of the blocks, as some blocks can occur in different orders and/or concurrently with other blocks from that shown and described. Moreover, less than all the illustrated blocks may be required to implement an example method. Blocks may be combined or separated into multiple components. Furthermore, additional and/or alternative methods can employ additional, not illustrated blocks. While the figures illustrate various actions occurring in serial, it is to be appreciated that various actions could occur concurrently, substantially in parallel, and/or at substantially different points in time.

Figure 3:
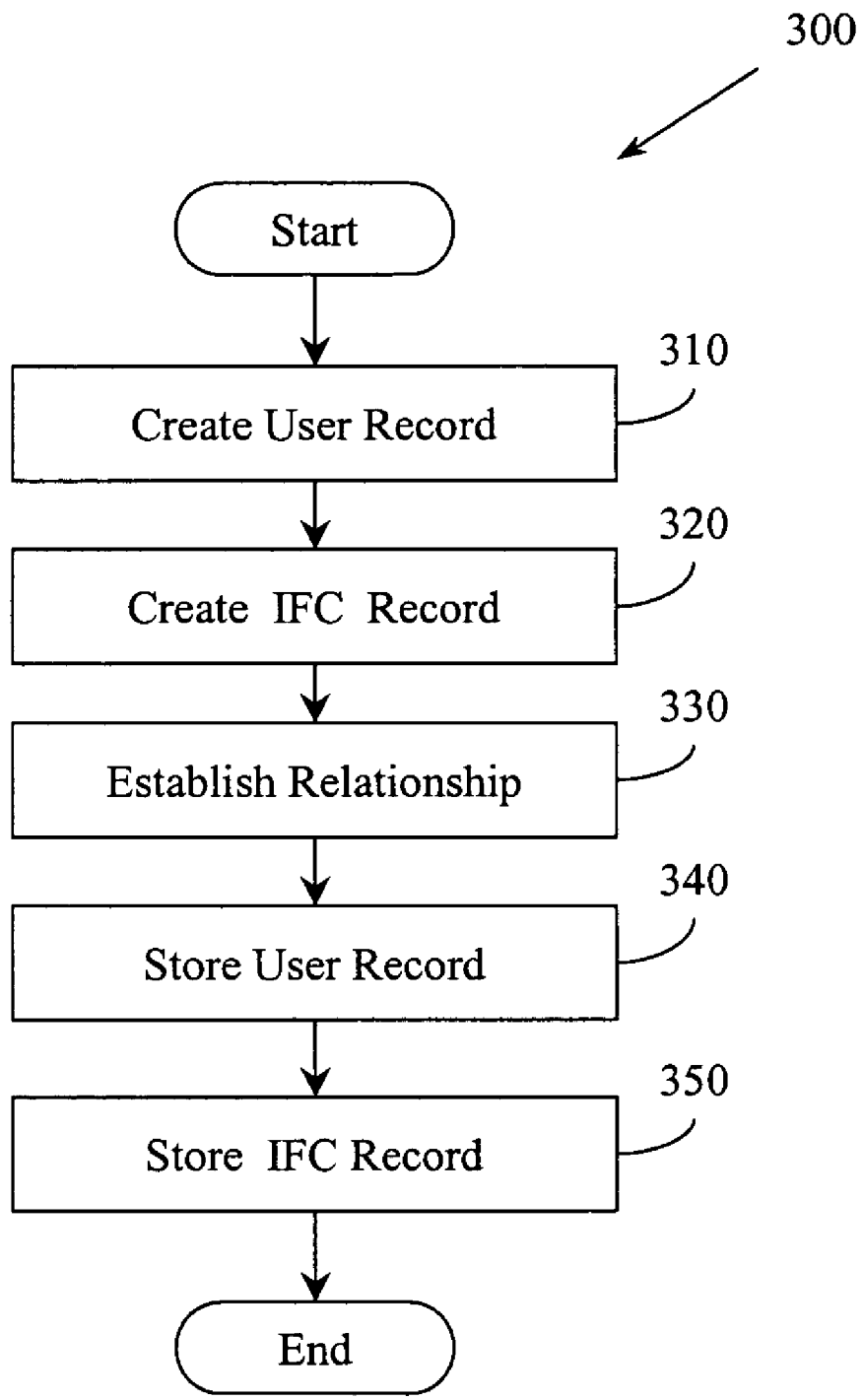
FIG. 3 illustrates an example method for configuring a portion of an IMS.

FIG. 3 illustrates an example method 300 for configuring a portion of an IMS. The illustrated elements denote "processing blocks" that may be implemented in logic. The described methods may be implemented as processor executable instructions and/or operations provided by a computer-readable medium.

Method 300 facilitates configuring a portion of an IMS. Method 300 may include, at 310, creating a user record. In one example the user record may be laid out according to the schema illustrated in FIG. 10. Method 300 may also include, at 320, creating an IFC record. In one example, the IFC record may be laid out according to the schema illustrated in FIG. 9. While an IFC record is described in 320, it is to be appreciated that in other examples, additional records (e.g., service profile, SPF-IFC, TP, TP-SPT, SPT) may be created in association with creating the IFC record.

Method 300 may also include, at 330, establishing a relationship between the user record and the IFC record using an IFC COS identifier. The relationship may be established, for example, using an IFC COS identifier associated with both the user file and the IFC file. In an example where the IFC database may be a database located logically underneath another database(s) (e.g., Service Profile database, SPF-IFC database), then the relationship between the user record IFC COS and the IFC database IFC COS may include an intermediate link using, for example, a service profile identifier. In this case, a user record in the user file may not include an IFC COS but rather a link to another database in which an IFC COS identifier may be located.

Method 300 may also include, at 340, storing the user record. The record may be stored, for example, in a user database (e.g., 110 FIG. 1, 240 FIG. 2). Similarly, method 300 may include, at 350, storing the IFC record. The IFC record may be stored, for example, in an IFC database (e.g., 120, FIG. 1). Additionally, when other related databases (e.g., trigger point database, service profile database, SPT database) are used, records associated with these databases may also be stored.

With the records created, linked, and stored, method 300 may also include, (not illustrated) provisioning a CSCF with user information including, for example, the IFC information. The provisioning may include, for example, providing a user record and an IFC record(s) to the CSCF logic. The two records may be related and the IFC record may be selected using an IFC COS identifier associated with the user record. As described above, in one example the IFC COS identifier may be directly associated with the user record by being located in the user record while in another example the IFC COS identifier may be indirectly associated with the user record by being located in a related database like a service profile database.

While FIG. 3 illustrates various actions occurring in serial, it is to be appreciated that various actions illustrated in FIG. 3 could occur substantially in parallel. By way of illustration, a first process could create and store user records, a second process could create and store IFC records, and a third process could create a relationship(s) between the user records and the IFC records. While three processes are described, it is to be appreciated that a greater and/or lesser number of processes could be employed and that lightweight processes, regular processes, threads, and other approaches could be employed.

Figure 4:
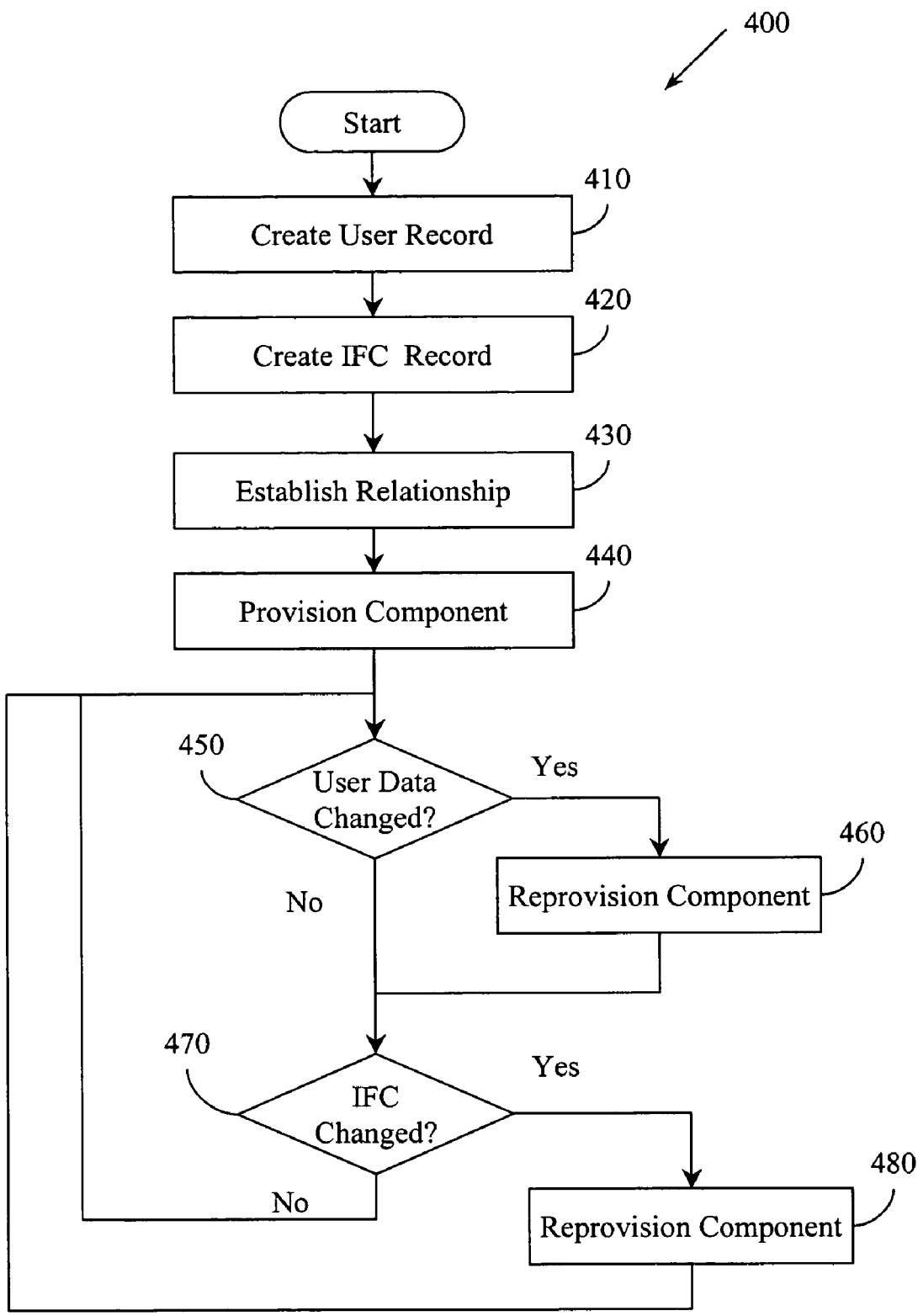
FIG. 4 illustrates an example method related to provisioning a portion of an IMS.

FIG. 4 illustrates an example method 400 associated with provisioning a portion of an IMS. Method 400 may include, at 410, creating a user record and at 420, creating an IFC record. The user record and the IFC record may be laid out according to the schemas illustrated in FIGS. 9 and 10. While a single IFC record is described, in one example the IFC record may include links to other records in various databases (e.g., SPF-IFC, TP, Service Profile). Thus, in one example, creating the IFC record may also include (not illustrated), creating a service profile record, creating an SPF-IFC record, and so on.

Method 400 may also include, at 430, establishing a relationship between the records using, for example, a COS identifier in and/or available to both records. With the records created and linked, method 400 may proceed, at 440, to provision a component (e.g., CSCF) with user and IFC data. Therefore, method 400 may also include, at 450, determining whether user data has changed. If it has, method 400 may proceed, at 460, to reprovision the CSCF with respect to the user data. The reprovisioning may include, for example, exchanging a PPR/PPA message pair. Similarly, method 400 may include, at 470, determining whether IFC data has changed. If so, method 400 may include, at 480, reprovisioning the CSCF with respect to IFC data. This reprovisioning may also include exchanging a PPR/PPA pair. While (re) provisioning a CSCF is described, it is to be appreciated that method 400 may also include, not illustrated (re)provisioning another component (e.g., an AS) with user and/or IFC data. AS (re)provisioning may involve, for example, a UDR/UDA exchange and/or a PNR/PNA exchange.

In one example, methods are implemented as processor executable instructions and/or operations stored on a computer-readable medium. Thus, in one example, a computer-readable medium may store processor executable instructions operable to perform a method that includes creating a user record, creating an IFC record, and establishing a relationship between the user record and the IFC record using a COS identifier. With the records created and linked, the method may then include storing the user record and storing the IFC record. While the above method is described being stored on a computer-readable medium, it is to be appreciated that other example methods described herein can also be stored on a computer-readable medium.

Figure 5:
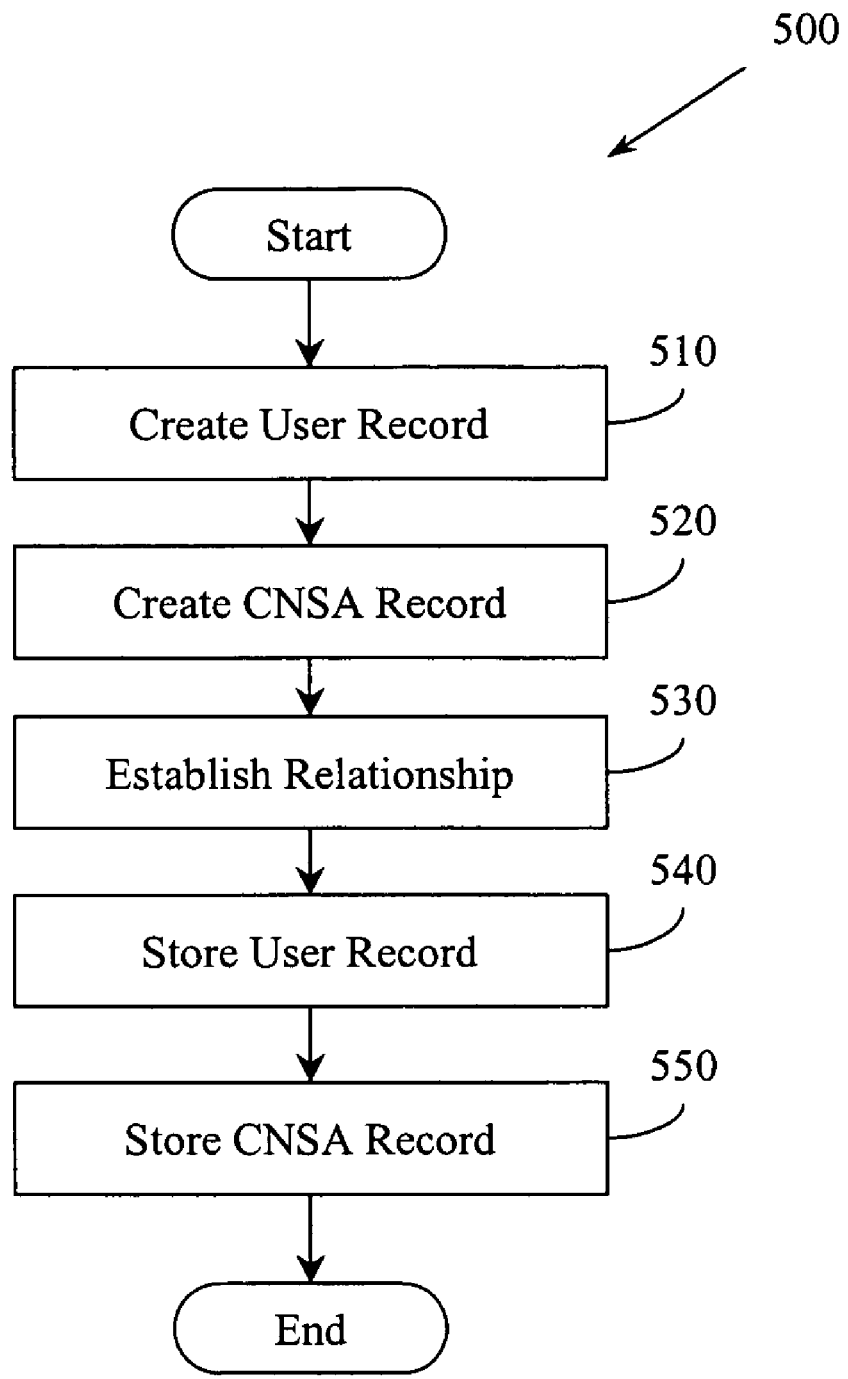
FIG. 5 illustrates an example method for configuring a portion of an IMS.

FIG. 5 illustrates an example method 500 that is associated with provisioning a portion(s) of an IMS. Method 500 may include, at 510, creating a user record and, at 520, creating a CNSA record. In one example the user record and CNSA record may be laid out according to the schema illustrated in FIG. 10. While creating a user record and creating a CNSA record is described, it is to be appreciated that in one example creating a user record and a CNSA record may include creating and/or accessing a service profile record. The service profile record may serve as an intermediate link between the user record and the CNSA record. Thus, the user record may include a link to the service profile record and the service profile link may include a CNSA COS identifier.

Method 500 may also include, at 530, establishing a relationship between the user record and the CNSA record. The relationship may be established using, for example, a COS identifier. When the intermediate service profile record is employed, establishing the link may include linking the user record to the service profile record and linking the service profile record to the CNSA record. With the records created and linked, method 500 may then proceed, at 540, to store the user record and at 550, to store the CNSA record. Once again, method 500 may also include (not illustrated), storing an intermediate record like a service profile record.

Creating and linking the records facilitates provisioning an IMS component (e.g., CSCF). Thus, method 500 may also include, (not illustrated), providing a user record to a CSCF logic and then providing a related CNSA record to the CSCF logic. The CNSA record can be selected based, at least in part, on a COS identifier in and/or related to the user record and/or in an intermediate record.

Figure 6:
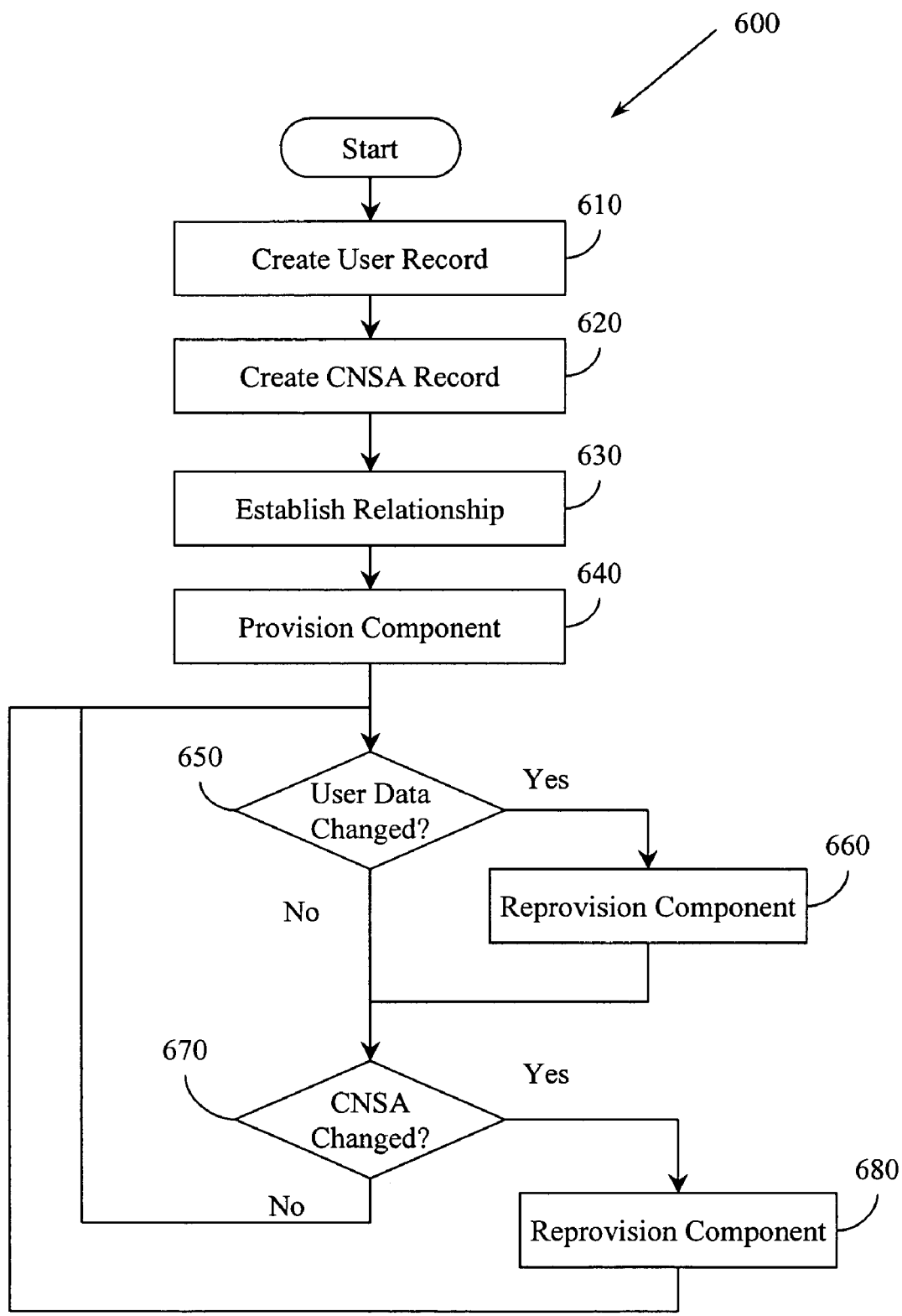
FIG. 6 illustrates an example method related to provisioning a portion of an IMS.

FIG. 6 illustrates an example method 600 associated with provisioning a portion of an IMS. Method 600 may include creating a user record at 610, creating a CNSA record at 620, establishing a relationship between the records at 630, and provisioning an IMS component (e.g., CSCF) with the records at 640. Provisioning the CSCF may include exchanging SAR/SAA pairs and/or UAR/UAA pairs. (See, FIG. 8). Additionally, when intermediate records are employed, method 600 may also include, creating an intermediate record like a service profile record, establishing links between the user record and the CNSA record via the intermediate record, and storing the intermediate record. The intermediate record may be for example, a service profile identifier.

Data associated with user and CNSA records may be dynamic. Therefore a CSCF may get out of date. Thus, method 600 may also include, at 650, determining whether user data has changed since being provided to the CSCF. If it has, then method 600 may include, at 660, providing an updated user record to the CSCF. Similarly, method 600 may include, at 670, determining whether CNSA data has changed since being provided to the CSCF. If it has, then method 600 may include, at 680, providing an updated CNSA record to the CSCF. Reprovisioning the CSCF may involve exchanging a PPR/PPA pair. While (re)provisioning a CSCF is described, it is to be appreciated that method 600 may also include, not illustrated (re)provisioning another component (e.g., AS) with user and/or IFC data. The AS (re)provisioning may involve, for example, a UDR/UDA exchange and/or a PNR/PNA exchange.

Figure 7:
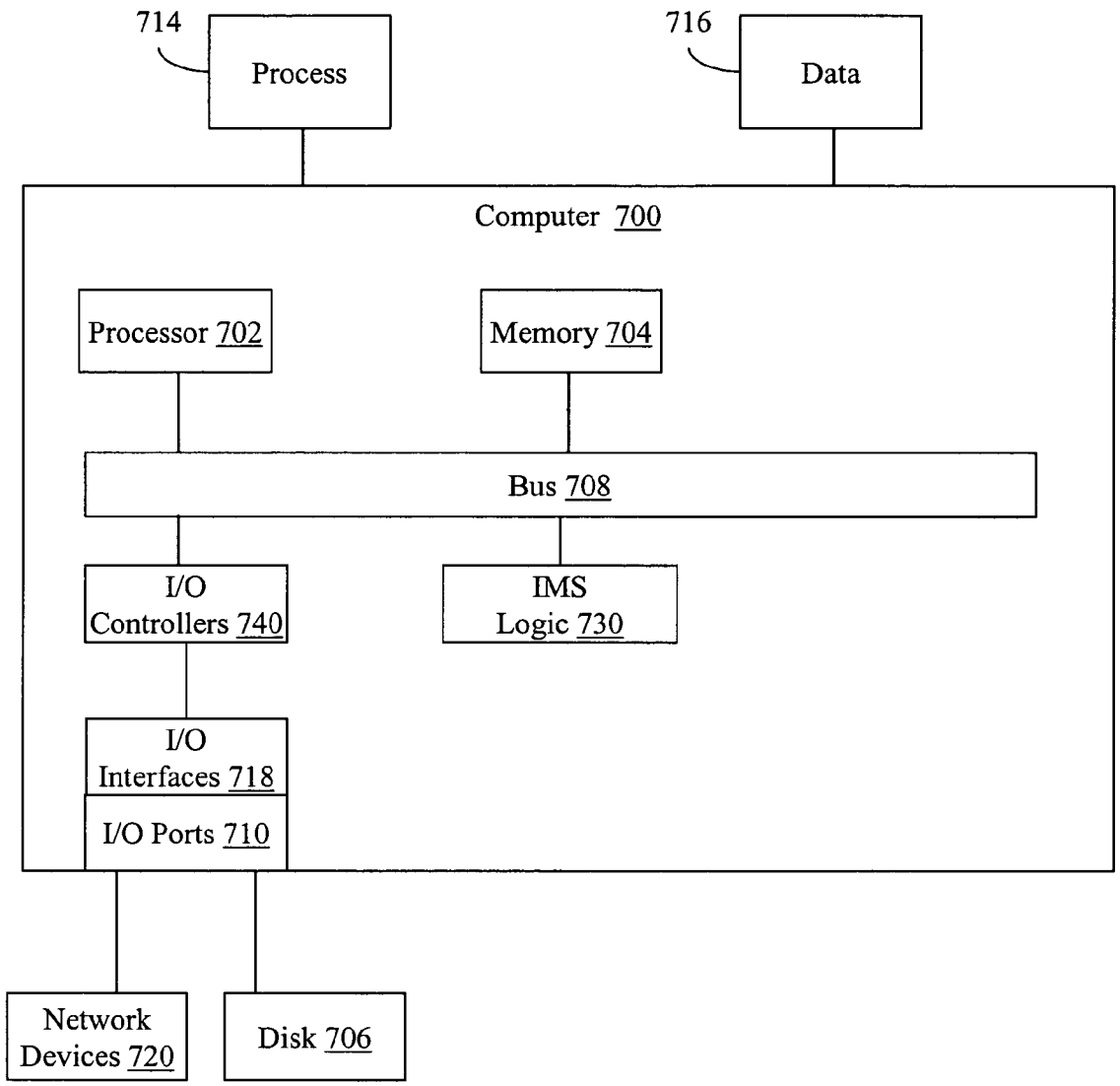
FIG. 7 illustrates an example computing environment in which example systems and methods illustrated herein can operate.

FIG. 7 illustrates an example computing device in which example systems and methods described herein, and equivalents, can operate. The example computing device may be a computer 700 that includes a processor 702, a memory 704, and input/output ports 710 operably connected by a bus 708. In one example, computer 700 may include an IMS logic 730 configured to facilitate provisioning a portion of an IMS. IMS logic 730 may provide means (e.g., hardware, software, firmware) for provisioning an IMS IFC database with IFC data. IMS logic 730 may also provide means (e.g., hardware, software, firmware) for provisioning an IMS user database with user data and means (e.g., hardware, software, firmware) for provisioning an IMS CNSA database with CNSA information. IMS logic 730 may also provide means (e.g., hardware, software, firmware) for provisioning a CSCF and/or AS with a first data that relates user data to IFC data based, at least in part, on a COS identifier and means (e.g., hardware, software, firmware) for provisioning the CSCF and/or AS with a second data that relates user data to CNSA data based, at least in part, on a COS identifier. While IMS logic 730 is illustrated as a logic operably connected to bus 708, it is to be appreciated that in one example IMS logic 730 may be implemented as software stored on disk 706, brought into memory 704 as a process 714, and executed by processor 702.

Generally describing an example configuration of the computer 700, processor 702 can be a variety of various processors including dual microprocessor and other multi-processor architectures. The memory 704 can include volatile memory and/or non-volatile memory. The non-volatile memory can include, but is not limited to, ROM, PROM, EPROM, EEPROM, and the like. Volatile memory can include, for example, RAM, synchronous RAM (SRAM), dynamic RAM (DRAM), synchronous DRAM (SDRAM), double data rate SDRAM (DDR SDRAM), and direct RAM bus RAM (DRRAM).

A disk 706 may be operably connected to the computer 700 via, for example, an input/output interface (e.g., card, device) 718 and an input/output port 710. The disk 706 can include, but is not limited to, devices including a magnetic disk drive, a solid state disk drive, a floppy disk drive, a tape drive, a Zip drive, a flash memory card, and/or a memory stick. Furthermore, the disk 706 can include optical drives including a CD-ROM, a CD recordable drive (CD-R drive), a CD rewriteable drive (CD-RW drive), and/or a digital video ROM drive (DVD ROM). The memory 704 can store processes 714 and/or data 716, for example. The disk 706 and/or memory 704 can store an operating system that controls and allocates resources of the computer 700.

The bus 708 can be a single internal bus interconnect architecture and/or other bus or mesh architectures. While a single bus is illustrated, it is to be appreciated that computer 700 may communicate with various devices, logics, and peripherals using other busses that are not illustrated (e.g., PCIE, SATA, Infiniband, 1394, USB, Ethernet). The bus 708 can be of a variety of types including, but not limited to, a memory bus or memory controller, a peripheral bus or external bus, a crossbar switch, and/or a local bus. The local bus can be of varieties including, but not limited to, an industrial standard architecture (ISA) bus, a microchannel architecture (MSA) bus, an extended ISA (EISA) bus, a peripheral component interconnect (PCI) bus, a universal serial (USB) bus, and a small computer systems interface (SCSI) bus.

The computer 700 may interact with input/output devices via i/o interfaces 718 and input/output ports 710. Input/output devices can include, but are not limited to, a keyboard, a microphone, a pointing and selection device, cameras, video cards, displays, disk 706, network devices 720, and the like. The input/output ports 710 can include but are not limited to, serial ports, parallel ports, and USB ports.

The computer 700 can operate in a network environment and thus may be connected to network devices 720 via the i/o devices 718, and/or the i/o ports 710. Through the network devices 720, the computer 700 may interact with a network. Through the network, the computer 700 may be logically connected to remote computers. The networks with which the computer 700 may interact include, but are not limited to, a local area network (LAN), a wide area network (WAN), and other networks. The network devices 720 can connect to LAN technologies including, but not limited to, fiber distributed data interface (FDDI), copper distributed data interface (CDDI), Ethernet (IEEE 802.3), token ring (IEEE 802.5), wireless computer communication (IEEE 802.11), Bluetooth (IEEE 802.15.1), and so on. Similarly, the network devices 720 can connect to WAN technologies including, but not limited to, point to point links, circuit switching networks like integrated services digital networks (ISDN), packet switching networks, and digital subscriber lines (DSL).

Figure 8:
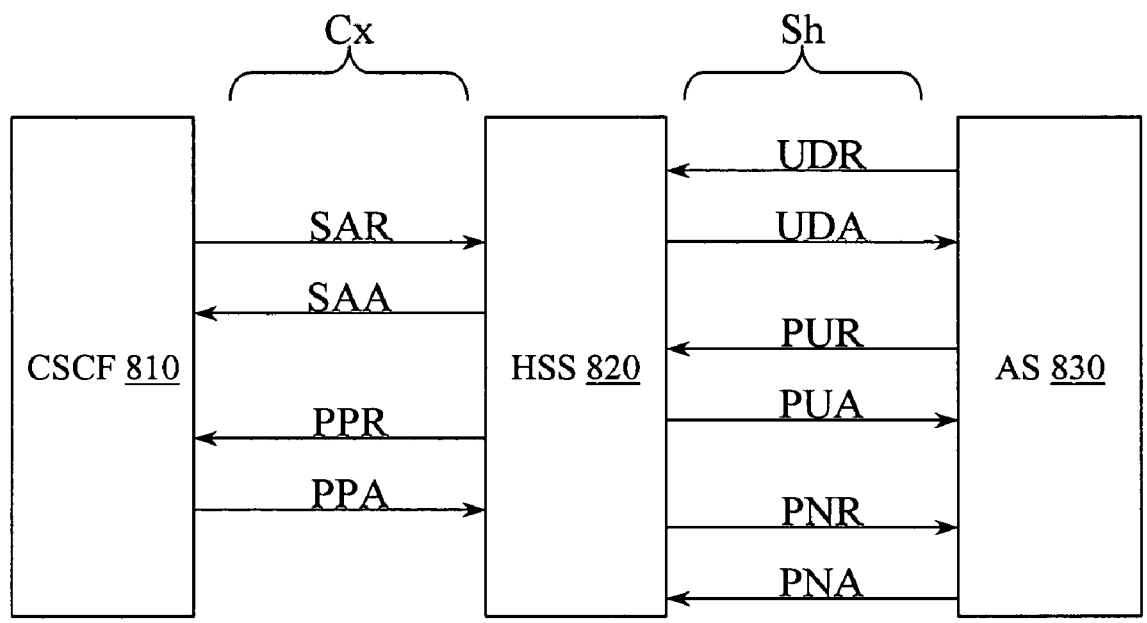

FIG. 8 illustrates an example set of messages that may be passed between an HSS 820 and a CSCF 810 and between the HSS 820 and an AS 830. The messages may be defined as part of a Cx protocol and/or as part of a Sh protocol, for example. These messages facilitate moving data from more permanent storage associated with an HSS to less permanent storage like that associated with a CSCF and/or AS. The HSS may store data on a user subscription timeframe while a CSCF and/or AS may store data on a user session timeframe. Thus, data may be moved from the HSS to the CSCF and/or AS on a per session basis, for example. Since data may change, even while a session is in progress, the protocol also facilitates updating a CSCF and/or AS should data change. The COS identifiers employed by the example systems and methods described herein facilitate mitigating maintenance issues associated with such changes.

The messages may include a server assignment request (SAR) and a server assignment answer (SM). The SAR may be sent from a client (e.g., S-CSCF) to a server (e.g., HSS) requesting data about the server assigned to serve the user. The SAR may include a session identifier, a public user identity, and a server name. The SM is returned from the server to the client in response to the SAR. The SAA may include a session identifier, a user name, user data, IFC data, CNSA data, and so on. The SAR/SAA exchange may occur, for example, when an S-CSCF is assigned to a public identity, when downloading from an HSS relevant information that an S-CSCF needs to serve a user, and so on.

The messages may also include a push profile request (PPR) and a push profile answer (PPA). The PPR is sent from a server (e.g., HSS) to a client (e.g., S-CSCF) to update data for a user. For example, if user data changes, IFC data changes, CNSA data changes, and so on, a PPR may be sent from an HSS to an S-CSCF. The PPR may include a session identifier, a user name, user data, IFC data, CNSA data, and so on. The PPA is returned in response to the PPR. A PPR/PPA exchange may occur, for example, when an S-CSCF is assigned to a user, when user data changes, and so on.

The messages may also include a user data request (UDR) and a user data answer (UDA). The UDR is sent from a client (e.g., AS) to a server (e.g., HSS) to request user data. The UDA is sent in response to the UDR and may include the requested user data.

The messages may also include a profile update request (PUR) and a profile update answer (PUA). The PUR is sent by a client (e.g., AS) to a server (e.g., HSS) to update data in the server. The PUA is sent in response to the PUR and may include an indication about whether the user was updated.

The messages may also include a push notification request (PNR) and a push notification answer (PNA). The PNR is sent by a server (e.g., HSS) to a client (e.g., AS) when data in the HSS changes. For example, IFC data may change and thus HSS 820 may inform AS 830 about the change using a PNR/PNA exchange. Thus, the messages described in connection with FIG. 8 facilitate passing user data between different IMS components and/or components connected to an IMS. The user data may include, for example, COS identifiers and/or service profile data that facilitates locating IFC data, CNSA data, and so on.

Figure 9:
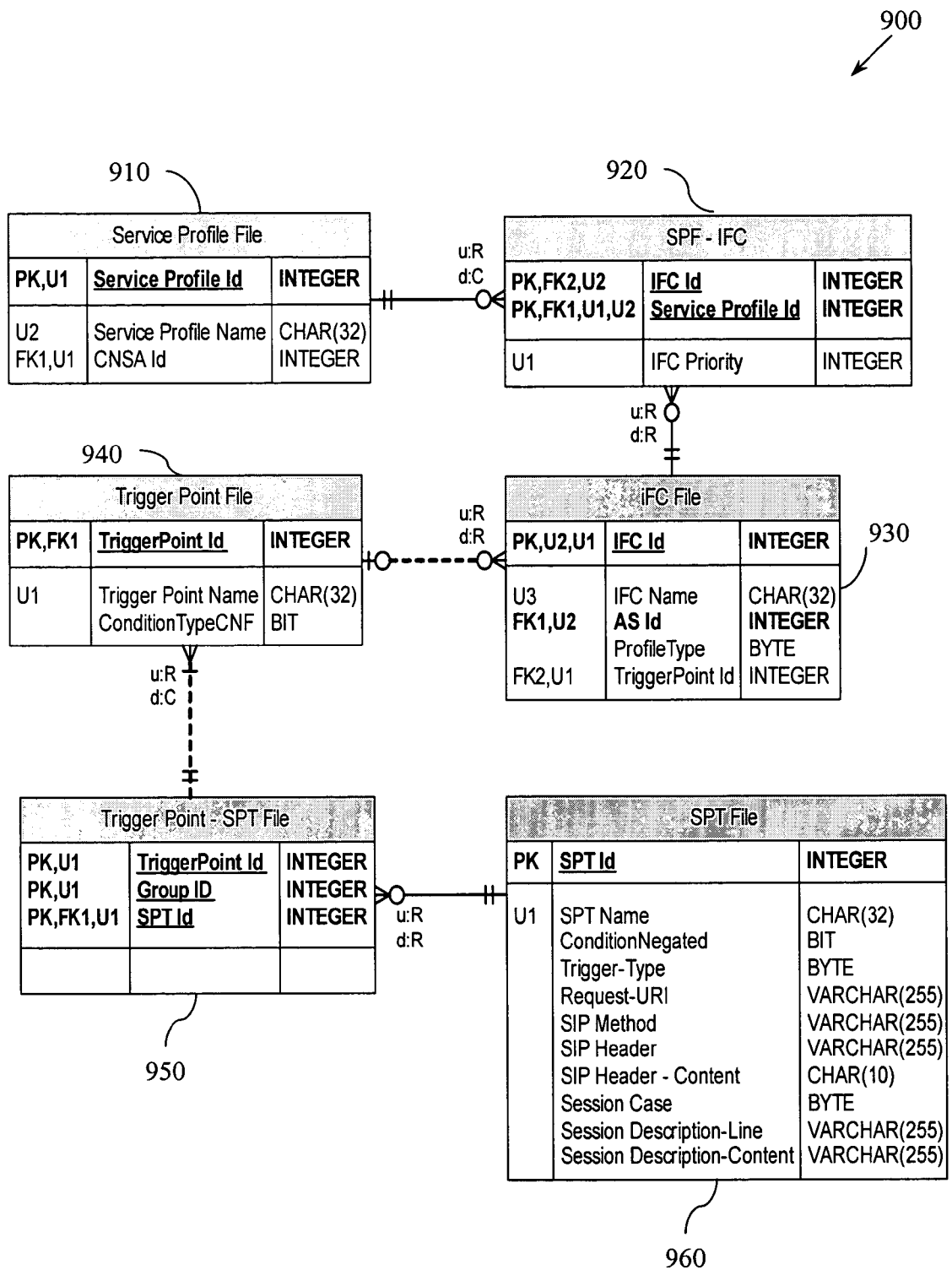
FIG. 9 illustrates an example schema.

FIG. 9 illustrates an example schema 900 that describes various data stores employed in connection with the example systems and methods described herein. It is to be appreciated that schema 900 is but one example and that different tables, different table arrangements, different dependencies, and so on may be employed.

Schema 900 includes a service profile data store 910. In one example, every public identity is associated with a service profile. The service profile data store 910 provides links to more information about a user, including a link to an SPF-IFC data store 920 that provides a link to an IFC data store 930 that in turn provides a link to a TP data store 940.

The SPF-IFC data store 920 facilitates keeping track of IFCs that are related to a particular service profile. Thus, SPF-IFC data store 920 can be provisioned with a COS identifier (e.g., IFC Id) that can in turn be used as a primary key to index into the IFC data store 930. Note that no specific IFC information has been linked to a user in data store 920. However, abstract information about an IFC has been linked using the IFC Id in data store 920. The service profile data store 910 may also include a CNSA COS identifier that facilitates linking to data stores described in FIG. 10.

The example IFC information stored in IFC data store 930 includes links to a TP file 940 and an AS file (not illustrated). The TP identifier is a primary key that facilitates linking records in the IFC data store 930 to records in the TP data store 940. The TP data store 940 may store information that describes, for example, how a set of service profile triggers (SPT)s are expressed and links to a TP-SPT data store (950). The TP-SPT data store 950 may in turn hold links to an SPT data store 960. The SPT data store 960 may include the actual rules, conditions, and so on that are used to evaluate a message. Thus, a single IFC that may be used by many IMS users via a COS technique may be implemented using the data stores described in FIG. 9.

The AS identifier in IFC data store 930 is a primary key that facilitates linking records in IFC data store 930 to an AS data store (not illustrated). When a TP associated with an IFC record in IFC data store 930 is satisfied, an AS reachable via the AS identifier may be employed to provide a service. It is to be appreciated that the data stores in FIG. 9 illustrate but one example of IFC information that may be decoupled from a user record and still be retrievable via a CSCF using a COS identifier provided in a user record.

Figure 10:
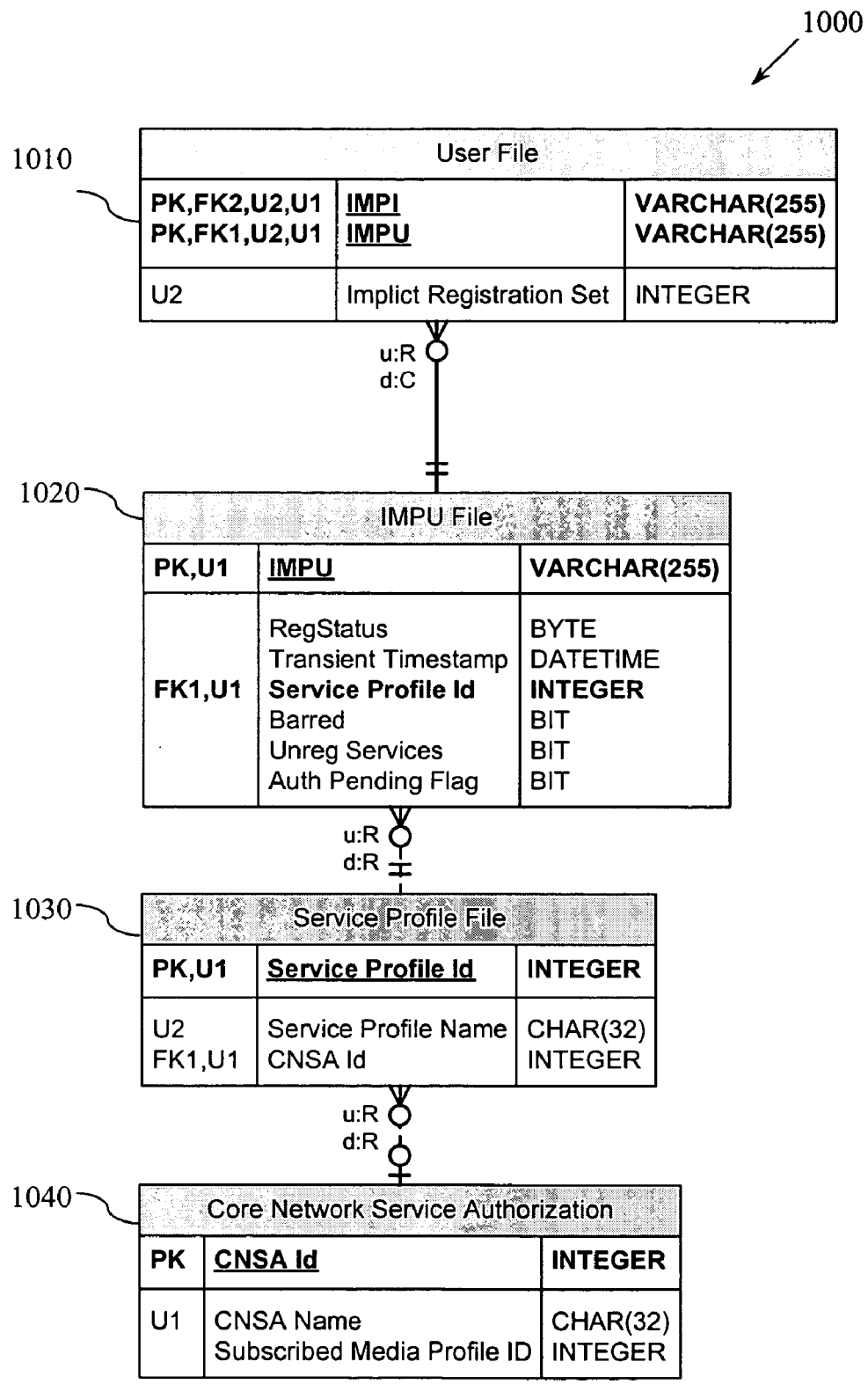
FIG. 10 illustrates another example schema.

FIG. 10 illustrates an example schema 1000 that describes various data stores employed in connection with the example systems and methods described herein. It is to be appreciated that schema 1000 illustrates but one example and that different tables, different table arrangements, different dependencies, and so on may be employed.

Schema 1000 includes a user data store 1010 and an IMPU data store 1020. The IMPU data store 1020 can be reached from user data store 1010 using, for example, the IMPU field. IMPU data store 1020 may include information about a user, including a link to a service profile data store 1030 (See also, service profile data store 910, FIG. 9). Note that at this point no specific CNSA information has been linked to a user. However, abstract information that can be followed to retrieve CNSA information has been stored in service profile data store 1030. The service profile data store 1030 may store a CNSA COS identifier that facilitates linking records in user data store 1020 to a CNSA data store 1040.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Additional advantages and modifications will readily appear to those skilled in the art. Therefore, the invention is not limited to the specific details, the representative apparatus, and illustrative examples shown and described. The application is intended to embrace alterations, modifications, and variations that fall within the scope of the appended claims. Furthermore, the preceding description is not meant to limit the scope of the invention. Rather, the scope of the invention is to be determined by the appended claims and their equivalents.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both". The term "and/or" is used in the same manner, meaning "A or B or both". When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

To the extent that the phrase "one or more of, A, B, and C" is employed herein, (e.g., a data store configured to store one or more of, A, B, and C) it is intended to convey the set of possibilities A, B, C, AB, AC, BC, and/or ABC (e.g., the data store may store only A, only B, only C, A&B, A&C, B&C, and/or A&B&C). It is not intended to require one of A, one of B, and one of C. When the applicants intend to indicate "at least one of A, at least one of B, and at least one of C", then the phrasing "at least one of A, at least one of B, and at least one of C" will be employed.

What is claimed is:

1. A system, comprising:
an initial filter criteria (IFO) database (IFCDB) stored in a computer-readable storage medium and configured to store IFO information concerning an Internet Protocol (IP) Multimedia Core Network Subsystem (IMS) user, the IFC information being stored in an IFC record in the IFCDB, an IFC record including an IFC class of service (COS) identifier, the IFCDB employing the IFC COS identifier as a primary key; and a user database stored in a computer-readable storage medium and configured to store user information concerning an IMS user, the user information being stored in a user record in the user database, a user record being associated with a service profile ID;

the service profile ID is configured to uniquely identify a service profile, where the service profile comprises a plurality of IFC COS identifiers;

where the IFCDB and the user database are operably connectable via a Home Subscriber Server (HSS) logic to a call session control function (CSCF) logic, the HSS logic being configured to:

retrieve a user record from the user database;

retrieve IFC information concerning the user from the IFCDB using an IFC COS identifier associated with the user record to select an IFO record from the IFCDB;

configure the CSCF logic to select an application server (AS) for servicing the user based, at least in part, on the IFC information retrieved from the IFCDB; and update the OSOF logic upon determining that IFO information concerning the user has changed in the IFCDB.

2. The system of claim 1, the HSS logic being configured to update the CSCF logic using a Push Profile Request (PPR) message defined in a Cx protocol.

3. The system of claim 1, the HSS logic being configured to update an application server (AS) upon determining that IFC information related to the AS has changed in the IFCDB.

4. The system of claim 1, the IFCDB including one or more IFC records, an IFC record comprising:
an IFC COS identifier;
an AS address; and
a link to a trigger point database record.

5. The system of claim 1, the user database including one or more user records, a user record comprising:
a user identifier; and
an IFC COS identifier.

6. The system of claim 5, the IFC COS identifier in a user record being configured to facilitate linking a user record to an IFC record in the IFCDB.

7. The system of claim 1, the user database including one or more user records, a user record comprising:
a user identifier; and
a service profile identifier configured to facilitate linking a user record to an IFC record using an IFC COS identifier.

8. A system, comprising:
a core network services authorization (CNSA) database (CNSADB) stored in a computer-readable storage medium and configured to store CNSA information, the CNSA information being stored in a CNSA record in the CNSADB, a CNSA record including a CNSA class of service (COS) identifier, the CNSADB employing the CNSA COS identifier as a primary key; and a user database stored in a computer-readable storage medium and configured to store user information concerning an internet protocol (IP) multimedia core network subsystem (IMS) user, the user information being stored in a user record in the user database, a user record being related to a service profile ID;

the service profile ID is configured to uniquely identify a service profile, where the service profile comprises a plurality of CNSA COS identifiers;

the CNSADB and the user database being operably connectable, via a Home Subscriber Server (HSS) logic, to a call session control function (CSCF) logic, the HSS logic being configured to:

retrieve a user record concerning the IMS user from the user database;

retrieve a CNSA record from the CNSADB using a CNSA COS identifier related to the user record;

selectively provision the CSCF based, at least in part, on the CNSA record; and update the CSOF logic upon determining that CNSA information concerning the IMS user has changed in the CNSADB.

9. The system of claim 8, the HSS logic being configured to update the CSCF logic using a Push Profile Request (PPR) message defined in a Cx protocol.

10. The system of claim 9, the user database including one or more user records that include:
a user identifier; and
a CNSA identifier.

11. The system of claim 10, the CNSA COS identifier associated with a user record being configured to facilitate linking a user record to a CNSA record in the CNSADB.

12. The system of claim 9, the user database including one or more records that include:
a user identifier; and
a service profile identifier configured to facilitate linking a user record to a CNSA record using a CNSA COS identifier.

13. A system, comprising:
at least one processor and at least one memory;
means for storing core network services authorization (CNSA) information, the CNSA information being stored in a CNSA record in a core network services authorization database (CNSADB), a CNSA record including a CNSA class of service (COS) identifier, the CNSADB employing the CNSA COS identifier as a primary key; and means for storing user information concerning an internet protocol (IP) multimedia core network subsystem (IMS) user, the user information being stored in a user record in the means for storing, a user record being related to a service profile ID;

the service profile ID is configured to uniquely identify a service profile, where the service profile comprises a plurality of CNSA COS identifiers;

the CNSADB and the means for storing being operably connectable, via a Home Subscriber Server (HSS) logic, to a call session control function (CSCF) logic, the HSS logic being configured to:

retrieve a user record concerning the IMS user from the user database;

retrieve a CNSA record from the CNSADB using a CNSA COS identifier related to the user record;

selectively provision the CSCF based, at least in part, on the CNSA record; and update the CSCF logic upon determining that CNSA information concerning the IMS user has changed in the CNSADB.

14. A method, comprising:
storing core network services authorization (CNSA) information in a CNSA database (CNSADB), the CNSA information being stored in a CNSA record in the CNSADB, a CNSA record including a CNSA class of service (COS) identifier, the CNSADB employing the CNSA COS identifier as a primary key; and storing, in a user database, user information concerning an internet protocol (IP) multimedia core network subsystem (IMS) user, the user information being stored in a user record in the user database, a user record being related to a service profile ID;

where the service profile ID uniquely identifies a service profile, where the service profile comprises a plurality of CNSA COS identifiers;

the CNSADB and the user database being operably connectable, via a Home Subscriber Server (HSS) logic, to a call session control function (CSCF) logic, the HSS logic performs a method of:

retrieving a user record concerning the IMS user from the user database;

retrieving a CNSA record from the CNSADB using a CNSA COS identifier related to the user record;

selectively provisioning the CSCF based, at least in part, on the CNSA record; and updating the CSCF logic upon determining that CNSA information concerning the IMS user has changed in the CNSADB.

15. A method, comprising:

storing, in an initial filter criteria (IFC) database (IFCDB), IFC information concerning an Internet Protocol (IP) Multimedia Core Network Subsystem (IMS) user, the IFC information being stored in an IFC record in the IFCDB, an IFC record including an IFC class of service (COS) identifier, the IFCDB employing the IFC COS identifier as a primary key; and storing, in a user database, user information concerning an IMS user, the user information being stored in a user record in the user database, a user record being associated with a service profile ID;

where the service profile ID uniquely identifies a service profile, where the service profile comprises a plurality of IFC COS identifiers;

where the IFCDB and the user database are operably connectable via a Home Subscriber Server (HSS) logic to a call session control function (CSCF) logic, the HSS logic performs a method of:

retrieving a user record from the user database;

retrieving IFC information concerning the user from the IFCDB using an IFC COS identifier associated with the user record to select an IFC record from the IFCDB;

configuring the CSCF logic to select an application server(AS) for servicing the user based, at least in part, on the IFC information retrieved from the IFCDB; and updating the CSCF logic upon determining that IFC information concerning the user has changed in the IFCDB.

* * * * *

UNITED STATES PATENT AND TRADEMARK OFFICE
CERTIFICATE OF CORRECTION

PATENT NO. : 7,613,705 B2 Page 1 of 1
APPLICATION NO. : 11/213361
DATED : November 3, 2009
INVENTOR(S) : John I. Ayers et al.

It is certified that error appears in the above-identified patent and that said Letters Patent is hereby corrected as shown below:

In column 14, line 62, in Claim 1, delete "IFO" and insert -- IFC --, therefor.

In column 14, line 64, in Claim 1, delete "IFO" and insert -- IFC --, therefor.

In column 15, line 18, in Claim 1, delete "IFO" and insert -- IFC --, therefor.

In column 15, line 23, in Claim 1, delete "OSOF" and insert -- CSCF --, therefor.

In column 15, line 23, in Claim 1, delete "IFO" and insert -- IFC --, therefor.

In column 16, line 11, in Claim 8, delete "CSOF" and insert -- CSCF --, therefor.

Signed and Sealed this

Twenty-seventh Day of April, 2010

David J. Kappos
*Director of the United States Patent and Trademark Office*